United States Patent

Roth et al.

[11] 3,953,233
[45] Apr. 27, 1976

[54] SEALED LITHIUM-SULFUR MONOCHLORIDE CELL

[75] Inventors: Walter L. Roth, Schenectady; Gregory C. Farrington, Elnora, both of N.Y.

[73] Assignee: General Electric Company, Schenectady, N.Y.

[22] Filed: Mar. 19, 1975

[21] Appl. No.: 559,990

[52] U.S. Cl. .............................. 136/6 FS; 136/153
[51] Int. Cl.² ......................................... H01M 10/00
[58] Field of Search................ 136/6 FS, 6 LN, 153

[56] References Cited
UNITED STATES PATENTS

| | | | |
|---|---|---|---|
| 3,573,105 | 3/1971 | Weininger et al. | 136/86 |
| 3,713,897 | 1/1973 | Liang | 136/153 |
| 3,879,224 | 4/1975 | Farrington et al. | 136/6 LN X |

OTHER PUBLICATIONS

"Progress in Solid State Chemistry", No. 7, Pergamon Press, 1972, Section 5, pp. 149–151, J. T. Kummer.

*Primary Examiner*—Howard S. Williams
*Assistant Examiner*—C. F. LeFevour
*Attorney, Agent, or Firm*—Paul R. Webb, II; Joseph T. Cohen; Jerome C. Squillaro

[57] ABSTRACT

A sealed lithium-sulfur monochloride cell is described which comprises a casing, an anode positioned within the casing, the anode selected from the class consisting of lithium, lithium as an amalgam, and lithium in a non-aqueous electrolyte, a cathode positioned within the casing, the cathode consisting of sulfur monochloride with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO \cdot 9Al_2O_3$ of which 1.3 to 85% of the total alkali ion content is lithium.

3 Claims, 2 Drawing Figures

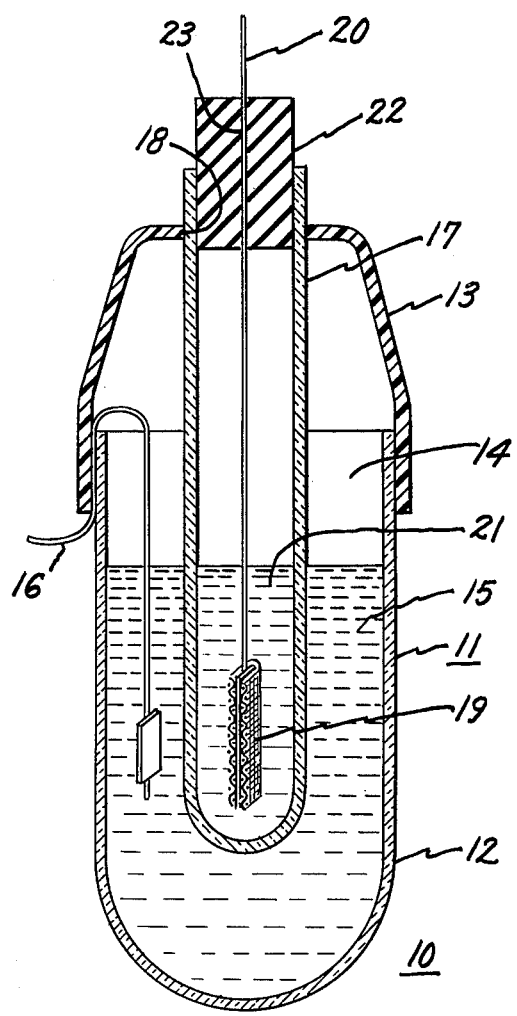

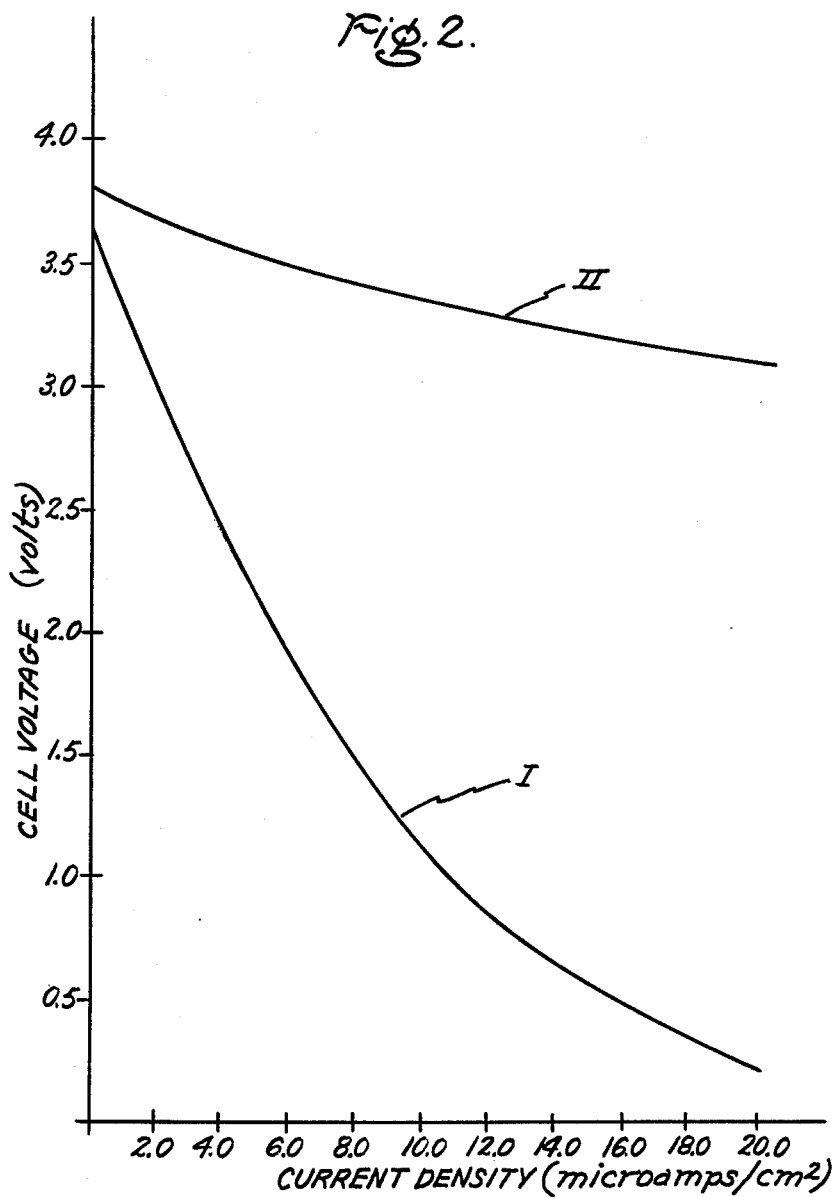

SEALED LITHIUM-SULFUR MONOCHLORIDE CELL

This invention relates to sealed cells and, more particularly, to such cells employing a lithium anode, a reducible sulfur monochloride cathode, and a solid lithiumsodium aluminate electrolyte.

Cross-reference is made to copending patent applications Ser. Nos. 517,511; 517,512 and 517,513 filed Oct. 24, 1974 in the names of Gregory C. Farrington and Walter L. Roth and entitled "Sealed Lithium-Bromine Cell", "Sealed Lithium-Iodine Cell", and "Sealed Lithium-Chlorine Cell", respectively.

Cross-reference is made to copending patent applications Ser. Nos. 557,583 and 557,584 filed Mar. 12, 1975 in the names of Walter L. Roth and Gregory C. Farrington and entitled "Sealed Lithium-Reducible Phosphorous Oxyhalide Cell" and "Sealed Lithium-Reducible Sulfur Oxyhalide Cell", respectively. Cross-reference is made to copending patent application Ser. No. 557,901 filed Mar. 19, 1975 in the names of Walter L. Roth and Gregory C. Farrington and entitled "Sealed Lithium-Reducible Gas Cell".

In Weininger et al. U.S. Pat. No. 3,573,105, there is described a rechargeable non-aqueous alkali metal-halogen electrochemical cell which includes an alkali metal anode, a halogen cathode, a non-aqueous electrolyte, and an ion-permeable barrier between the electrodes to inhibit migration of halogen to the negative electrode. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al. barrier. The electrolyte of the present invention permits cell operation at temperatures above the polymer barrier stability of Weininger et al.

In Liang U.S. Pat. No. 3,713,897, there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. Our electrolyte is not prone to destruction in non-aqueous solvents as opposed to the Liang patent material.

In "Progress in Solid State Chemistry", No. 7, edited by A. Reiss and J. O. McCaldin, published by Pergamon Press in 1972, there is a Section 5 entitled "β-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between β-alumina and various binary nitrate melts containing $NaNO_3$ and another metal nitrate at 300°–350°C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lithium ions in a melt of $LiNO_3$–$LiCl$. Throughout the above Kummer publication there is no recognition that the lithium-sodium β-alumina produced by equilibration of sodium beta-alumina with molten $LiNO_3$ is a unique and stable compound which can readily transport lithium ions.

Our present invention is directed to a sealed lithium-sulfur monochloride cell with positive separation of the anode and cathode by a solid lithium-sodium aluminate electrolyte which is lithium ion conductive.

The primary object of our invention is to provide a sealed lithium-sulfur monochloride cell which has high cell voltage, high energy density, a near-zero self-discharge rate, exceptionally long storage life, and stability at elevated temperatures.

In accordance with one aspect of our invention, a sealed lithium-sulfur monochloride cell employs a lithium anode, a sulfur monochloride cathode, and a solid lithiumsodium aluminate electrolyte which is a lithium-ion conductor therebetween.

These and various other objects, features and advantages of the invention will be better understood from the following description taken in connection with the accompanying drawing in which:

FIG. 1 is a sectional view of a lithium-sulfur monochloride cell made in accordance with our invention;

FIG. 2 is a set of polarization curves showing cell performances of the cell shown in FIG. 1.

In FIG. 1 of the drawing there is shown generally at 10 a sealed lithium-sulfur monochloride cell embodying our invention. An outer casing 11 comprising a lower casing portion 12 of glass and an upper casing portion 31 of polyethylene affixed tightly to the upper open end of the lower casing portion 11 thereby provides a chamber 14 for a cathode 15 of sulfur monochloride. An electrical lead 16 in the form of a platinum wire or graphite filament is immersed in cathode 15 and extends to the exterior of cell 10 through the junction of the lower and upper casing portions 11 and 12. An inner casing 17 in the form of a tube of solid lithium-sodium aluminate electrolyte is positioned within casing 11 and immersed partially in cathode 15. An opening 18 is provided in the top of upper casing portion 13 into which tube 17 fits tightly. An anode 19 of lithium metal in the form of a lithium ribbon pressed onto a nickel mesh which is folded together and attached to the end of a nickel electrical lead 20. An anolyte 21 partially fills tube 17 and is in contact with lithium anode 19. An electrically insulating closure 22 with a hole 23 therethrough is provided at the upper end of tube 17 to seal the initially open end of the tube. Lead 20 extends through hole 23 in closure 22 to the exterior of cell 10.

In FIG. 2, performance of the cell shown in FIG. 1 is provided by polarization curves. In this FIG., cell voltage in volts is plotted against current density in microamperes per square centimeter.

We found that we could form a sealed lithium-sulfur monochloride cell with a lithium ion-conductive electrolyte by employing a casing having a cathode portion and an anode portion. These two portions are separated by a solid lithium-sodium aluminate electrolyte in disc or tube form which will be further described below. Such a casing may be provided in various configurations such as for example shown in FIG. 1. The cell of FIG. 1 employs an outer casing comprising a lower casing portion of glass and an upper casing portion of a plastic such as polyethylene affixed tightly to the upper open end of the lower casing portion thereby providing a chamber for a cathode such as sulfur monochloride. An electrical lead in the form of a platinum wire or graphite filament is immersed in the cathode and extends to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium metal in the form such as lithium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

For the anode we employ lithium, lithium as an amalgam or lithium in a non-aqueous electrolyte. For the cathode we can employ sulfur monochloride with an ionic conductivity enhancing material. We employ a solid lithium-sodium aluminate electrolyte between the cathode and anode to provide a solid barrier preventing contact between the electrodes and to provide lithium ion-conductivity.

We can form solid lithium-sodium ion-conductive electrolytes with an approximate composition of $LiNaO \cdot 9Al_2O_3$ of which 1.3 to 85 percent of the total alkali content is lithium. As it was discussed above in "Progress and Solid State Chemistry", J. T. Kummer, in Section 5 has described a lithium-sodium $\beta$-alumina material, particularly on pages 149–151. Further, it is described in the article how to manufacture such material. As it will be particularly noted throughout the above Kummer publication, there is no recognition that the lithium-sodium $\beta$-alumina produced by equilibration of sodium beta-alumina with molten $LiNO_3$ is a unique and stable compound which can readily transport lithium ions. Such electrolyte material containing 50 percent lithium ions appears to be the optimum amount of lithium ions in the material.

A range of 40 to 60 percent lithium ions in the electrolyte material with the remainder sodium ions provides the desirable conductivity for the operation of our cells. We can obtain the desirable conductivity necessary for the operation of our cells by employing a broader range of 1.3 to 85 percent lithium ions in the electrolyte material with the remainder sodium ions. Tubes made of solid lithium-sodium aluminate electrolyte containing, respectively, 1.34 and 84.7 percent sodium ion substitution by lithium ions were used in cells of the type shown in FIG. 1 and as described above. The results of performance of these cells are shown in FIG. 2.

We found further that for the cathode we could employ sulfur monochloride with various ionic conductivity enhancing materials such as chemically stable conductive salts. Various ion conductivity enhancing materials include chemically stable conductive solvents such as propylene carbonate and chemically stable salts such as $LiClO_4$, tetraalkylammonium tetrafluoroborates, etc.

Lithium is the lightest practical solid battery anode material and is also the most reducing. The lithium ion is a small and strongly polarizing ion. The salts of the lithium ions are generally more soluble in non-aqueous solvents than their sodium ion counterparts. Such high solubility helps eliminate salt precipitation on the faces of a solid electrolyte. Various non-aqueous electrolytes which are suitable with lithium include propylene carbonate, butyrolactone, tetrahydrofuran and acetonitrile.

Examples of sealed lithium-sulfur monochloride cells made in accordance with our invention are set forth below:

EXAMPLES I AND II

Two cells, Nos. I and II, were assembled as generally described above and as shown in FIG. 1 of the drawing. The cells were constructed in the same manner with the exception that one lithium-sodium aluminate tube, No. I, had an 84.7 percent lithium ion content while the other lithium-sodium aluminate tube, No. II, had a 1.34 percent lithium ion content. The remaining alkali ion content of the tube was sodium ions.

The tube for cell No. I was formed from a tube of sodium $\beta$-alumina approximately 6.2 cm. long, 1.1 cm. OD, and 0.15 cm. wall thickness. The tube was baked out overnight at 1175°C prior to lithium ion exchange. The lithium ion exchange was made by immersion in lithium nitrate at 600°C for 13 hours. A resulting 3.12 percent weight decrease corresponded to 84.7 percent sodium substitution by lithium ions.

The tube for cell No. II was formed from an identical sodium $\beta$-alumina tube which was baked out in the same manner. The lithium ion exchange was made by immersion in 20 mole percent lithium nitrate and 80 mole percent sodium nitrate at 400°C for 72 hours. A resulting 0.049 percent weight decrease corresponded to 1.34 percent sodium substitution by lithium ions.

For each cell, an outer casing was formed of a lower casing portion of glass and an upper casing portion of polyethylene affixed tightly to the upper open end of the lower casing portion thereby providing a chamber for the cathode of sulfur monochloride in an electrolyte of propylene carbonate, 0.1 M tetrabutylammonium tetrafluoroborate, saturated with $LiClO_4$. An electrical lead in the form of a platinum wire was immersed in the cathode and extended to the exterior of the cell through the junction of the lower and upper casing portions. An inner casing in the form of a tube of solid lithium-sodium aluminate electrolyte was positioned within the outer casing and immersed partially in the cathode. The tube for cell No. I contained 84.7 percent lithium ion content while the tube for cell II contained 1.34 percent lithium ion content. An opening was provided in the top of each upper casing into which the respective tube fitted tightly. An anode of lithium metal in the form of a lithium metal ribbon pressed onto a nickel mesh was folded together and attached to the end of a nickel electrical lead. An anolyte of 0.1 M tetrabutylammonium tetrafluoroborate in propylene carbonate saturated with $LiClO_4$ partially filled each tube and was in contact with the lithium anode. An electrically insulating closure with a hole therethrough was provided at the upper end of each tube to seal the initially open end of the tube. The lead extended through the hole in the closure to the exterior of the cell. These structures resulted in two sealed lithium-sulfur monochloride cells made in accordance with our invention.

EXAMPLES II AND III

The performance of the cells, Nos. I and II, of Example I, is shown in the polarization curves in FIG. 2 of the drawing which were produced at a temperature of 26°C. The cell voltage in volts is plotted against current in microamperes per square centimeter for each cell.

No attempts were made to minimize interfacial polarization at the lithium-sodium aluminate ion-conductive electrolyte interfaces.

While other modifications of the invention and variations thereof which may be employed within the scope of the invention have not been described, the invention is intended to include such as may be embraced within the following claims.

What we claim as new and desire to secure by Letters Patent of the U.S. is:

1. A sealed lithium-sulfur monochloride cell comprises a casing, an anode positioned within the casing, the anode selected from the class consisting of lithium, lithium as an amalgam and lithium in a non-aqueous electrolyte, a cathode positioned within the casing, the cathode comprising sulfur monochloride with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO \cdot 9Al_2O_3$ of which 1.3 to 85.0% of the total alkali ion content is lithium.

2. A sealed lithium-sulfur monochloride cell as in claim 1, in which 1.3 percent of the total alkali ion content of the solid lithium-sodium aluminate electrolyte composition is lithium.

3. A sealed lithium-sulfur monochloride cell as in claim 1, in which 85.0 percent of the total alkali ion content of the solid lithium-sodium aluminate electrolyte composition is lithium.

* * * * *